United States Patent
Lin et al.

(10) Patent No.: US 8,843,427 B1
(45) Date of Patent: Sep. 23, 2014

(54) PREDICTIVE MODELING ACCURACY

(75) Inventors: Wei-Hao Lin, New York, NY (US); Travis H. K. Green, New York, NY (US); Robert Kaplow, New York, NY (US); Gang Fu, Kearny, NH (US); Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 156 days.

(21) Appl. No.: 13/195,349

(22) Filed: Aug. 1, 2011

Related U.S. Application Data

(60) Provisional application No. 61/504,119, filed on Jul. 1, 2011.

(51) Int. Cl.
*G06F 15/18* (2006.01)
*G06N 3/08* (2006.01)

(52) U.S. Cl.
USPC .................... 706/45; 705/16; 705/21; 705/25

(58) Field of Classification Search
USPC .......................................................... 706/45
See application file for complete search history.

(56) References Cited

U.S. PATENT DOCUMENTS

| | | | |
|---|---|---|---|
| 7,349,919 | B2 | 3/2008 | Russell et al. |
| 2003/0212851 | A1 | 11/2003 | Drescher et al. |
| 2005/0234753 | A1 | 10/2005 | Pinto et al. |
| 2009/0106178 | A1 | 4/2009 | Chu |

OTHER PUBLICATIONS www.uclassify.com (uclassify), May 18, 2010.*
Duchi, John, et al., "Boosting with Structural Sparsity", 2009, cs.berkeley.edu [online]. [Retrieved on Jan. 25, 2011]. Retrieved from the Internet: <URL: http://www.cs.berkeley.edu/~jduchi/projects/DuchiSi09d.pdf>, 41 pages.
Duchi, John, et al., "Boosting with Structural Sparsity", Proceedings of the 26th International Conference on Machine Learning, Montreal, Canada, 2009, cs.berkeley.edu [online]. [Retrieved on Jan. 25, 2011]. Retrieved from the Internet: <Url: http://www.cs.berkeley.edu/~jduchi/projects/DuchiSi09a.pdf>, 8 pages.
R-Project web pages, 190 pages [online]. [Retrieved on May 18, 2010]. Retrieved from the Internet: <URL: http://www.r-project.org/>, 190 pages.

(Continued)

*Primary Examiner* — Jeffrey A Gaffin
*Assistant Examiner* — Nathan Brown, Jr.
(74) *Attorney, Agent, or Firm* — Fish & Richardson P.C.

(57) ABSTRACT

In general, a method includes receiving a training data set that includes a plurality of examples, wherein each example includes one or more features and an answer, generating a plurality of modified training data sets by applying one or more filters to the training data set, each of the plurality of modified training data sets being based on a different combination of the one or more filters, training a plurality of predictive models, each of the plurality of predictive models being trained using a different modified training data set of the plurality of modified training data sets, determining a respective accuracy for each of the plurality of predictive models, identifying a most accurate predictive model based on the determined accuracies, and specifying an association between the training data set and the combination of filters used to generate the modified training data set that was used to train the most accurate predictive model.

38 Claims, 7 Drawing Sheets

(56) References Cited

OTHER PUBLICATIONS

Uclassify web pages, [online]. [Retrieved on May 18, 2010]. Retrieved from the Internet: <URL: http://www.uclassify.com>, 16 pages.

Zementis web pages [online]. [Retrieved on May 18, 2010]. Retrieved from the Internet: <URL: http://www.zementis.com>, 34 pages.

Weiss, Integrating Real-Time Predictive Analytics into SAP Applications [online], Dec. 30, 2009 [retrieved on Sep. 29, 2011], Retrieved from the Internet: ,URL:http://www.sdn.sap.com/irj/scn/go/portal/prtroot/docs/library/uuid/a07faefd-61d7-2c10-bba6-89ac5ffc302c?QuickLink=index&overridelayout=true>, 1 page.

Hutter, et al., "Performance Prediction and Automated Tuning of Randomized and Parametric Algorithms,", Principles and Practice of Constraint Programing, Lecture Notes in Computer Science, 2006, 15 pages.

SAS Rapid Predictive Modeler, Overview, 2010, 4 pages.

Postema, et al., "A Decision Support Tool for Tuning Parameters in a Machine Learning Algorithm", Nanyang Techonological University, 1997, 9 pages.

"Active learning (machine learning)," Wikipedia, the free encyclopedia, [online ] [retrieved on Sep. 8, 2011]. Retrieved from the Internet: http://en.wikipedia.org/wiki/Active learning (machine learning), 3 pages.

* cited by examiner

PREDICTIVE MODELING ACCURACY

CROSS-REFERENCE TO RELATED APPLICATION

This application claims the benefit of prior U.S. provisional application 61/504,119, filed Jul. 1, 2011, which is incorporated in its entirety herein by reference.

TECHNICAL FIELD

This specification relates to predictive modeling and, in particular to improving the accuracy of predictive models.

BACKGROUND

Predictive analytics generally refers to techniques for extracting information from data to build a model that can predict an output from a given input. Predicting an output can include predicting future trends or behavior patterns or performing sentiment analysis, to name a few examples. Various types of predictive models can be used to analyze data and generate predictive outputs. Typically, a predictive model is trained with training data that includes input data and output data that mirror the form of input data that will be entered into the predictive model and the desired predictive output, respectively.

SUMMARY

In general, in one aspect, a computer-implemented method includes receiving a training data set that includes a plurality of examples, wherein each example includes one or more features and an answer, generating a plurality of modified training data sets by applying one or more filters to the training data set, each of the plurality of modified training data sets being based on a different combination of the one or more filters, training a plurality of predictive models, each of the plurality of predictive models being trained using a different modified training data set of the plurality of modified training data sets, determining a respective accuracy for each of the plurality of predictive models, identifying a most accurate predictive model based on the determined accuracies, and specifying an association between the training data set and the combination of filters used to generate the modified training data set that was used to train the most accurate predictive model.

Aspects may include one or more of the following features. One or more characteristics of the training data set are identified. Specifying an association between the training data set and the combination of filters associated with the most accurate predictive model includes specifying an association between the combination of filters and the one or more characteristics of the training data set. A second training data set is received, and determining that the second training data set includes one or more characteristics that are similar to the one or more characteristics associated with the training data set. Determining that the second training data set includes one or more characteristics that are similar includes determining a level of similarity between the characteristics associated with the second training data set and the one or more characteristics associated with the second training data set, and determining that the level of similarity satisfies a threshold. The combination of filters associated with the most accurate predictive model is applied to the second training data set based on determining that the second training data set includes one or more characteristics that are similar to the one or more characteristics associated with the training data set. An unfiltered predictive model is trained based on the training data set, the unfiltered predictive model being trained without an application of the one or more filters; and a level of accuracy associated with the unfiltered predictive model is determined. The training data set includes text-based data. The one or more filters include one or more of a n-gram filter, a stopword filter, a punctuation filter, and a stemming filter. The training data set includes numerical data. The one or more filters include one or more of a shift and scale filter, a p-degree polynomial filter, and a spline transformation filter.

Particular embodiments of the subject matter described in this specification can be implemented so as to realize one or more of the following. The accuracy of a predictive model can be improved by altering its training data set (e.g., using one or more filters). Effective filter combinations can be stored in order to improve the accuracy of future predictive models generated for training data sets that share characteristics with a prior training data set associated with the effective filter combinations. Furthermore, when handling large volumes of training data and/or input data, processes associated with generating predictive models can be scaled across multiple computers at, for example, a data center. In some examples, parameter exploration techniques can be used in which different input parameters are tried in various machine learning algorithms to determine which input parameters are effective for a given dataset.

DESCRIPTION OF DRAWINGS

Like reference symbols in the various drawings indicate like elements.

DETAILED DESCRIPTION

Figure 1:
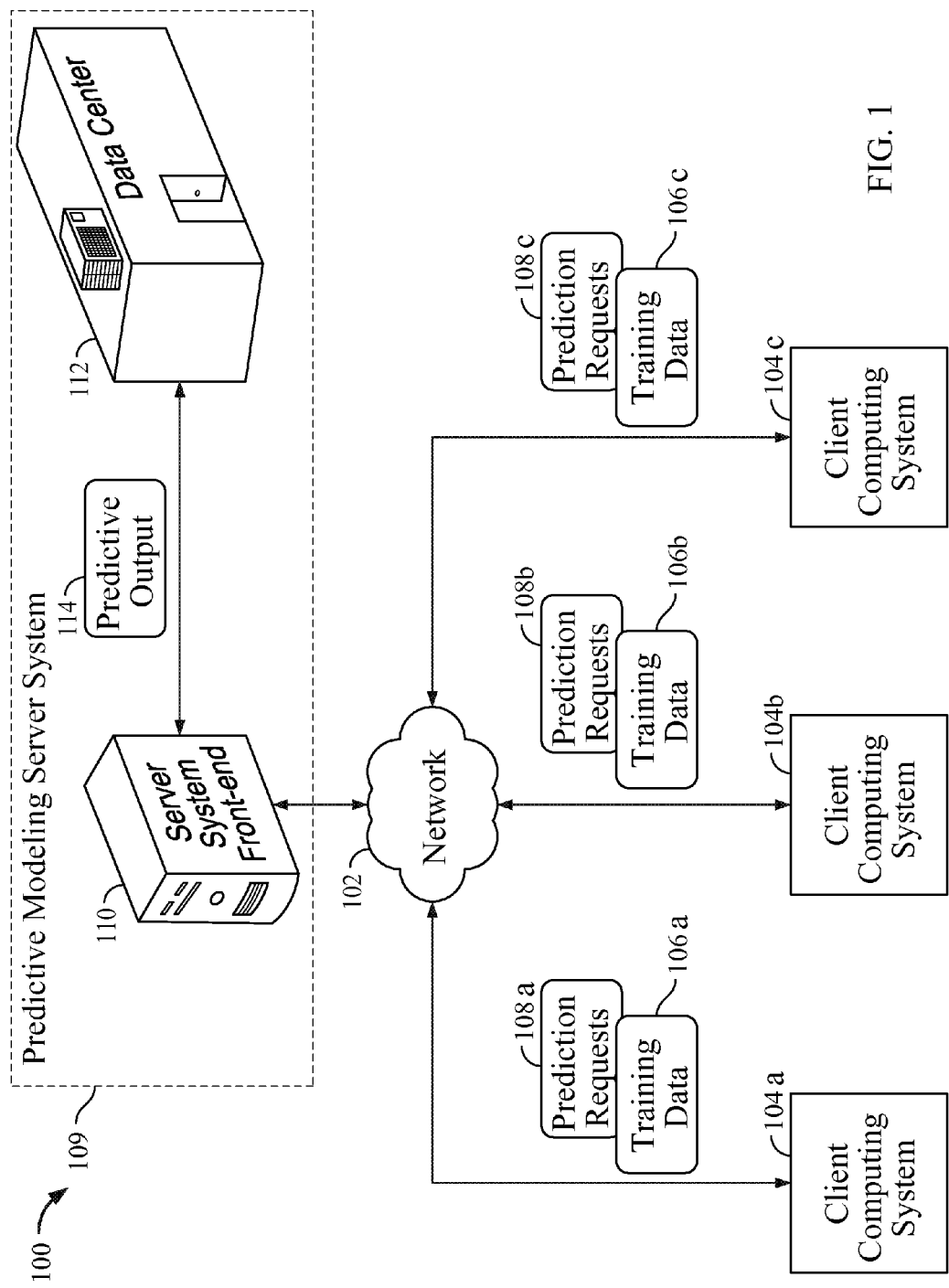
FIG. 1 is a schematic representation of an example system that provides a predictive analytic platform.

A client entity—an individual or a group of people or a company, for example—may desire a trained predictive model that can receive input data from a client computing system belonging to or under the control of the client entity and generate a predictive output. A model that has been trained using uploaded data, or a previously trained model, can be invoked by scripts to obtain predictions for queries. In various implementations, a model is either categorical (if its predictions are categories) or regression (if its predictions are numeric). Training data comprises examples that each comprise one or more data values (or "features") plus an answer (a category or a value) for that example. By way of illustration, the training data in TABLE 1 consists of examples that are email message subject lines and an answer that indicates whether each example represents SPAM or not.

TABLE 1

| EMAIL SUBJECT LINE | ANSWER |
| --- | --- |
| "You have won $$$" | "spam" |
| "Lose weight fast!" | "spam" |
| "Lowest interest rates ever!" | "spam" |
| "How are you?" | "not spam" |
| "Trip to New York" | "not spam" |

Training data such as that represented by TABLE 1 above can include multiple columns that represent various features of the training data. For example, TABLE 1 could also include an additional column associated with a body section of an email, or may contain tens, hundreds, thousands, or more additional columns for other features of the training data. For example, TABLE 2 represents text-based training data in which each example includes a column for each word that appears in the "email subject line" column of TABLE 1.

TABLE 2

| EMAIL SUBJECT LINE | A | B | C | D | ANSWER |
| --- | --- | --- | --- | --- | --- |
| "You have won $$$" | You | Have | Won | $$$ | "spam" |
| "Lose weight fast!" | Lose | Weight | Fast | | "spam" |
| "Lowest interest rates ever!" | Lowest | Interest | Rates | Ever | "spam" |
| "How are you?" | How | are | you | ? | "not spam" |
| "Trip to New York" | Trip | to | New | York | "not spam" |

As shown above, in addition to the "email subject line" column, TABLE 2 includes columns A-D which each represent an individual word found in the email subject line. Individual columns can be provided for other features of training data, such as punctuation (as seen in column D in TABLE 2), a user identity associated with, for example, an email, a number of recipients associated with an email, and most any other feature of training data. As will be discussed below with regard to FIGS. 5 and 6, training data (and the tables that represent it) can be further modified according to the application of one or more filters.

After a model has been trained against training data, queries can be submitted to the model. In some examples, queries are similar in form to training examples: that is, a query has the same data values but does not include the answer. The trained model uses patterns that it learned from the training data to either find the closest category for the submitted query (if it is a categorical model) or estimate a value for the query (if it is a regression model), and returns the category or value.

In some examples, training data and predictive models can be used in combination with one or more filters to increase the effectiveness of a predictive analytic platform 100. In general, one or more filters may be applied to a set of training data to generate new training data to be used in training different predictive models. The accuracy of the trained predictive models can be tested and ranked, and useful combinations of filters can be identified based on the accuracy of the trained predictive models. Filters that improve the performance of a predictive model can be associated with the training data they were applied to. An optimal filter combination can be selected for use with new training data sets that have characteristics similar to the characteristics of previously analyzed training data sets.

FIG. 1 is a schematic representation of a system 100 that provides a predictive analytic platform. The system 100 includes multiple client computing systems 104a-c that can communicate with a predictive modeling server system 109. In the example shown, the client computing systems 104a-c can communicate with a server system front end 110 by way of a network 102. The network 102 can include one or more local area networks (LANs), a wide area network (WAN), such as the Internet, a wireless network, such as a cellular network, or a combination of all of the above. The server system front end 110 is in communication with, or is included within, one or more data centers, represented by the data center 112. A data center 112 generally is a large numbers of computers, housed in one or more buildings that are typically capable of managing large volumes of data.

To train a particular predictive model can require a significant volume of training data, for example, one or more gigabytes of data. The client computing system 104a may be unable to efficiently manage such a large volume of data. Further, selecting and tuning an effective predictive model from the variety of available types of models can require skill and expertise that an operator of the client computing system 104a may not possess. The system 100 allows training data 106a to be uploaded from the client computing system 104a to the predictive modeling server system 109 over the network 102. The training data 106a can include initial training data, which may be a relatively large volume of training data the client entity has accumulated, for example, if the client entity is a first-time user of the system 100. The training data 106a can also include new training data that can be uploaded from the client computing system 104a as additional training data becomes available. The client computing system 104a may upload new training data whenever the new training data becomes available on an ad hoc basis, periodically in batches, in a batch once a certain volume has accumulated, or otherwise.

The server system front end 110 can receive, store and manage large volumes of data using the data center 112. One or more computers in the data center 112 can run software that uses the training data to estimate the effectiveness of multiple types of predictive models and make a selection of a trained predictive model to be used for data received from the particular client computing system 104a. The selected model can be trained and the trained model made available to users who have access to the predictive modeling server system 109 and, optionally, permission from the client entity that provided the training data for the model. Access and permission can be controlled using conventional techniques for user authorization and authentication and for access control, if restricting access to the model is desired. The client computing system 104a can transmit prediction requests 108a over the network. The selected trained model executing in the data center 112 receives the prediction request, input data and request for a predictive output, and generates the predictive output 114. The predictive output 114 can be provided to the client computing system 104a, for example, over the network 102.

Advantageously, when handling large volumes of training data and/or input data, the processes can be scaled across multiple computers at the data center 112. The predictive modeling server system 109 can automatically provision and allocate the required resources, using one or more computers as required. An operator of the client computing system 104a is not required to have any special skill or knowledge about predictive models. The training and selection of a predictive model can occur "in the cloud," (e.g., over the network 102), thereby lessening the burden on the client computing system's processor capabilities and data storage, and also reducing the required client-side human resources.

The term client computing system is broadly used in this description to refer to one or more computers (which may be at one or more physical locations) that can access the predictive modeling server system. The data center 112 is capable of handling large volumes of data (e.g., on the scale of terabytes or larger) and, as such, can serve multiple client computing systems. For illustrative purposes, three client computing systems 104a-c are shown, however, scores of client computing systems can be served by such a predictive modeling server system 109.

Figure 2:
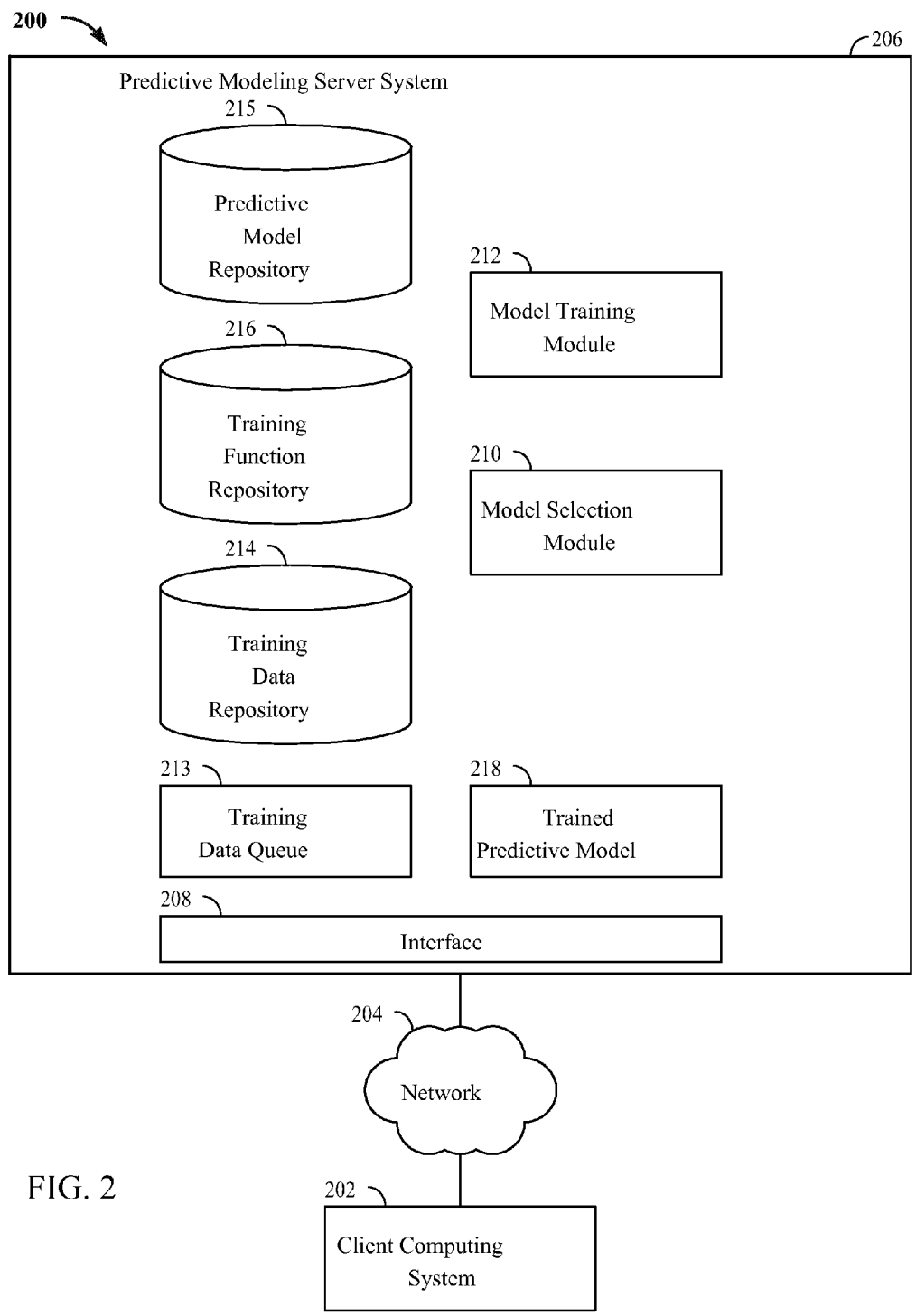
FIG. 2 is a schematic block diagram showing an example system for providing a predictive analytic platform.

FIG. 2 is a schematic block diagram showing a system 200 for providing a predictive analytic platform over a network. For illustrative purposes, the system 200 is shown with one client computing system 202 communicating over a network 204 with a predictive modeling server system 206. However, it should be understood that the predictive modeling server system 206, which can be implemented using multiple computers that can be located in one or more physical locations, can serve multiple client computing systems. In the example shown, the predictive modeling server system includes an interface 208. In some implementations the interface 208 can be implemented as one or more modules adapted to interface with components included in the predictive modeling server system 206 and the network 204, for example, the training data queue 213, the training data repository 214, the model selection module 210 and/or the predictive model repository 218. In some examples, queue 213 maintains a list of training jobs that have been sent but have not yet been trained. The data repository 214 stores user data is stored, and the stored user data can be used when a training job is sent. A model selection module 210 can be used after training to determine which predictive model to use (e.g., by determining the best model for the data when multiple predictive modules are trained). In some examples, the model repository 215 stores predictive model(s) specified by the model selection module 210.

Figure 3:
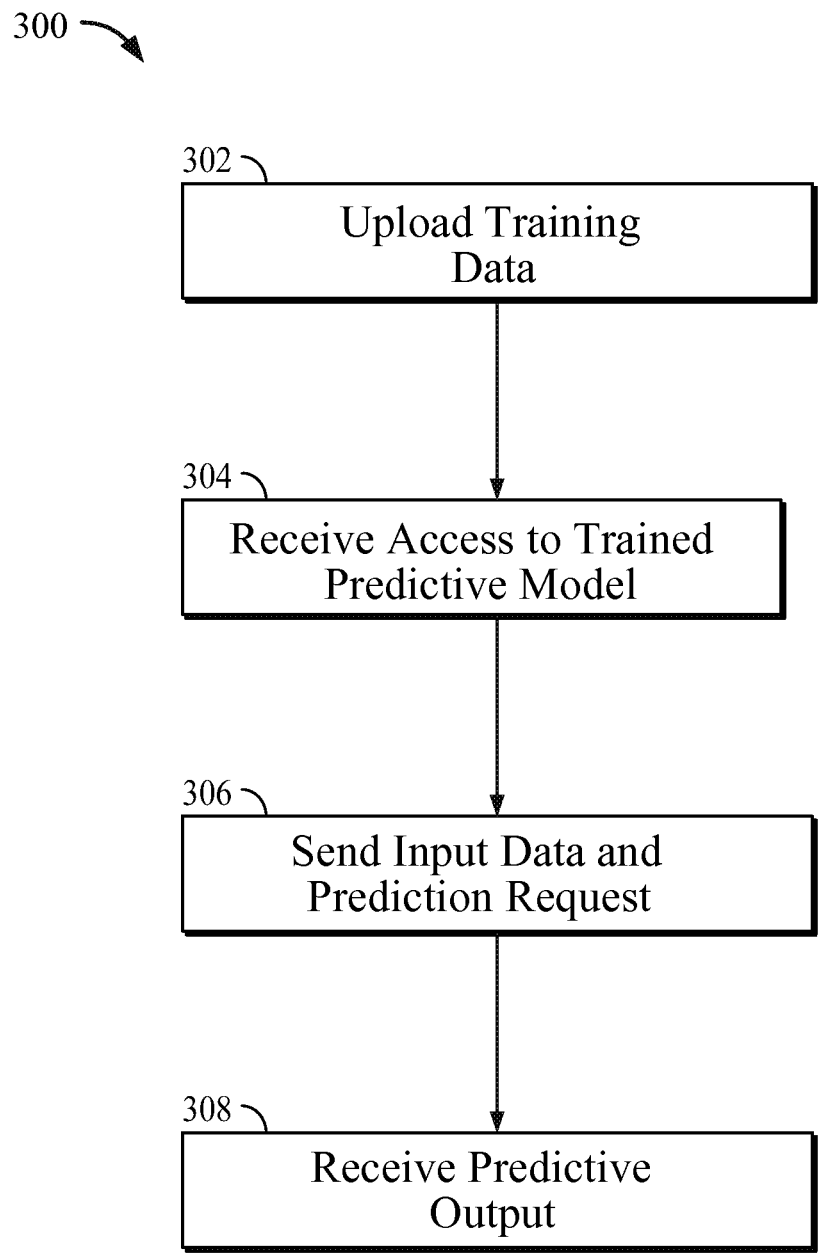
FIGS. 3 and 4 are flowcharts that show example processes for using the predictive analytic platform.

FIG. 3 is a flowchart showing an example process 300 for using the predictive analytic platform from the perspective of the client computing system 202. The process 300 can be carried out by the client computing system 202 when the corresponding client entity is uploading the initial training data to the system 206. The client computing system 202 uploads training data (i.e., the initial training data) to the predictive modeling server system 206 over the network 204 (302). In some implementations, the initial training data is uploaded in bulk (e.g., in a batch) by the client computing system 202. In other implementations, the initial training data is uploaded incrementally by the client computing system 202 until a threshold volume of data has been received that together forms the initial training data. The size of the threshold volume can be set by the system 206, the client computing system 202 or otherwise determined. In response, the client computing system 202 receives access to a trained predictive model, for example, trained predictive model 218 (304).

In the implementations shown, the trained predictive model 218 is not itself provided. The trained predictive model 218 resides and executes at a location remote from the client computing system 202. For example, referring back to FIG. 1, the trained predictive model 218 can reside and execute in the data center 112, thereby not using the resources of the client computing system 202. Once the client computing system 202 has access to the trained predictive model 218, the client computing system can send input data and a prediction request to the trained predictive model (306). In response, the client computing system receives a predictive output generated by the trained predictive model from the input data (308).

From the perspective of the client computing system 202, training and use of a predictive model is relatively simple. The training and selection of the predictive model, tuning of the hyper-parameters and features used by the model (to be described below) and execution of the trained predictive model to generate predictive outputs can be done remote from the client computing system 202 without expending client computing system resources. The amount of training data provided can be relatively large (e.g., gigabytes or more), which is often an unwieldy volume of data for a client entity.

Figure 4:
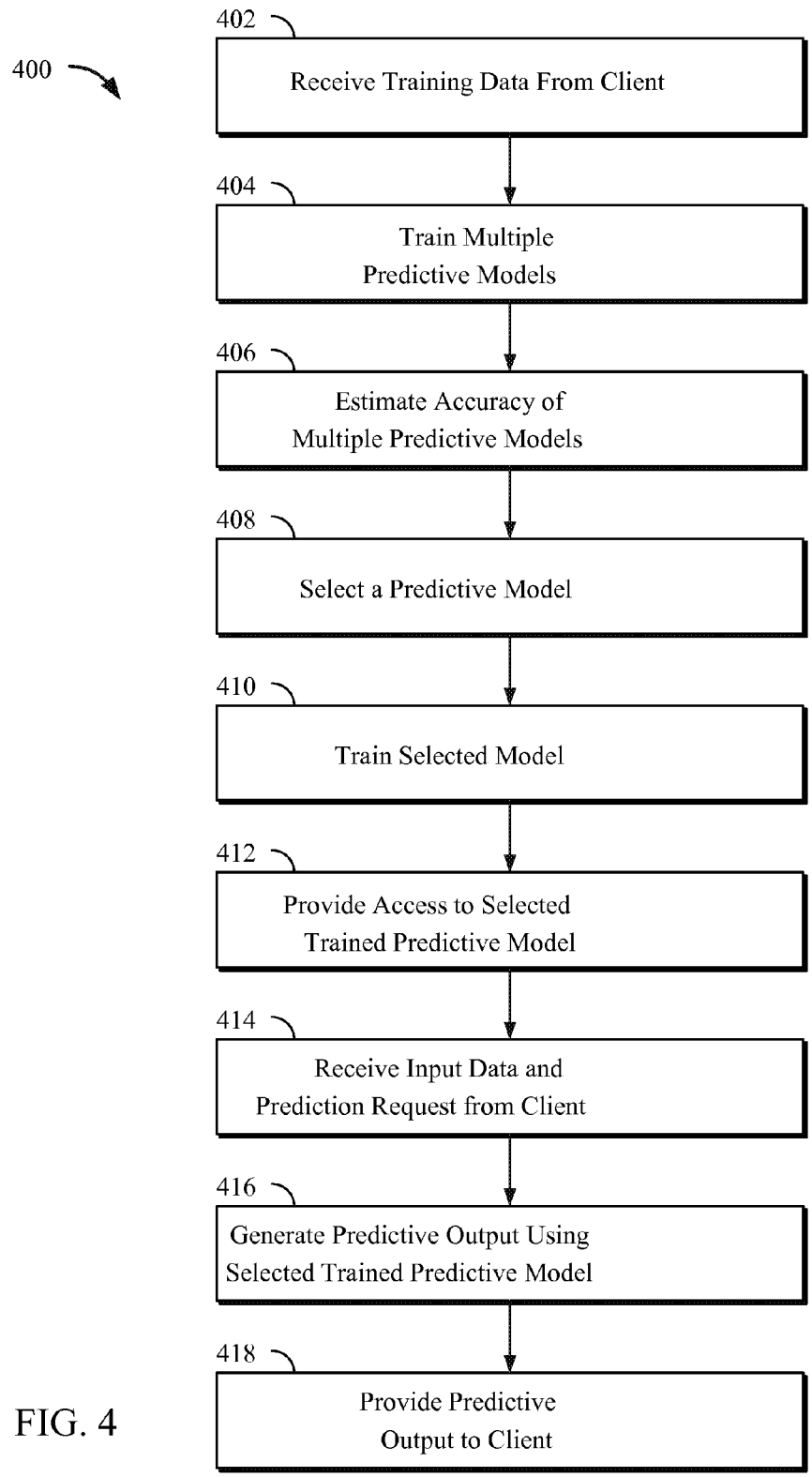

The predictive modeling server system 206 will now be described in more detail with reference to the flowchart shown in FIG. 4. FIG. 4 is a flowchart showing an example process 400 for serving a client computing system using the predictive analytic platform. The process 400 is carried out to provide access of a selected trained predictive model to the client computing system, which trained predictive model has been trained using initial training data. Providing accessing to the client computing system of a predictive model that has been retrained using new training data (i.e., training data available after receiving the initial training data) is described below in reference to FIGS. 5 and 6.

Referring to FIG. 4, training data (i.e., initial training data) is received from the client computing system (402). For example, the client computing system 202 can upload the training data to the predictive modeling server system 206 over the network 204 either incrementally or in bulk (e.g., as one or more batches). As describe above, if the initial training data is uploaded incrementally, the training data can accumulate until a threshold volume is received before training of predictive models is initiated. The training data can be in any convenient form that is understood by the modeling server system 206 to define a set of records, where each record includes an input and a corresponding desired output. By way of example, the training data can be provided using a comma-separated value format, or a sparse vector format. In another example, the client computing system 202 can specify a protocol buffer definition and upload training data that complies with the specified definition.

The process 400 and system 200 can be used in various different applications. Some examples include (without limitation) making predictions relating to customer sentiment, transaction risk, species identification, message routing, diagnostics, churn prediction, legal docket classification, suspicious activity, work roster assignment, inappropriate content, product recommendation, political bias, uplift marketing, e-mail filtering and career counseling. For illustrative purposes, the process 400 and system 200 will be described using an example that is typical of how predictive analytics are often used.

In this example, the client computing system 202 provides a web-based online shopping service. The training data includes multiple records, where each record provides the online shopping transaction history for a particular customer. The record for a customer includes the dates the customer made a purchase and identifies the item or items purchased on each date. The client computing system 202 is interested in predicting a next purchase of a customer based on the customer's online shopping transaction history.

Various techniques can be used to upload a training request and the training data from the client computing system 202 to the predictive modeling server system 206. In some implementations, the training data is uploaded using a Hypertext Transfer Protocol (HTTP) web service. The client computing system 202 can access storage objects using a RESTful API to upload and to store their training data on the predictive modeling server system 206. In some examples, RESTful API refers to a Representational State Transfer, which is a style of software architecture for distributed hypermedia systems such as the World Wide Web.

In other implementations, the training data is uploaded using a hosted execution platform. The predictive modeling server system 206 can provide utility software that can be used by the client computing system 202 to upload the data. In some implementations, the predictive modeling server system 206 can be made accessible from many platforms, including platforms affiliated with the predictive modeling server system 206, and platforms entirely independent of the predictive modeling server system 206, e.g., a desktop application. The training data can be large, e.g., many gigabytes. The predictive modeling server system 206 can include a data store, e.g., the training data repository 214, operable to store the received training data.

The predictive modeling server system 206 includes a repository of training functions for various predictive models, which in the example shown are included in the training function repository 216. At least some of the training functions included in the repository 216 can be used to train an "updateable" predictive model. An updateable predictive model refers to a trained predictive model that was trained using a first set of training data (e.g., initial training data) and that can be used together with a new set of training data and a training function to generate a "retrained" predictive model. The retrained predictive model is effectively the initial trained predictive model updated with the new training data.

One or more of the training functions included in the repository 216 can be used to train "static" predictive models. A static predictive model refers to a predictive model that is trained with a batch of training data (e.g., initial training data) and is not updateable with incremental new training data. If new training data has become available, a new static predictive model can be trained using the batch of new training data, either alone or merged with an older set of training data (e.g., the initial training data) and an appropriate training function.

Some examples of training functions that can be used to train a static predictive model include (without limitation): regression (e.g., linear regression, logistic regression), classification and regression tree, multivariate adaptive regression spline and other machine learning training functions (e.g., Naïve Bayes, k-nearest neighbors, Support Vector Machines, Perceptron). Some examples of training functions that can be used to train an updateable predictive model include (without limitation) Online Bayes, Winnow, Support Vector Machine (SVM) Analogue, Maximum Entropy (MaxEnt), Gradient based (FOBOS) and AdaBoost with Mixed Norm Regularization. The training function repository 216 can include one or more of these example training functions.

In some scenarios, a recency weighted predictive model can be trained. In general, a recency weighted predictive model is a predictive model that is trained giving increased significance to more recent training data data as compared to earlier received training data. A recency weighted predictive model can be used to improve predictive output in response to a change in input data. By way of illustrative example, a trained predictive model that is used to predict a user behavior can adapt to changes that can affect user behavior. For example, in the spring, individuals change from purchasing winter boots to purchasing sandals. A recency weighted predictive model can reflect this change more rapidly than a conventionally trained predictive model.

Referring again to FIG. 4, multiple predictive models, which can be all or a subset of the available predictive models, are trained using some or all of the training data (404). In the example predictive modeling server system 206, a model training module 212 is operable to train the multiple predictive models. The multiple predictive models include one or more updateable predictive models and can include one or more static predictive models.

The client computing system 202 can send a training request to the predictive modeling server system 206 to initiate the training of a model. For example, a GET or a POST request could be used to make a training request to a URL. A training function is applied to the training data to generate a set of parameters. These parameters form the trained predictive model. For example, to train (or estimate) a Naïve Bayes model, the method of maximum likelihood can be used. A given type of predictive model can have more than one training function. For example, if the type of predictive model is a linear regression model, more than one different training function for a linear regression model can be used with the same training data to generate more than one trained predictive model.

For a given training function, multiple different hyper-parameter configurations can be applied to the training function, again generating multiple different trained predictive models. Therefore, in the present example, where the type of predictive model is a linear regression model, changes to an L1 penalty generate different sets of parameters. Additionally, a predictive model can be trained with different features, again generating different trained models. The selection of features, i.e., feature induction, can occur during multiple iterations of computing the training function over the training data. For example, feature conjunction can be estimated in a forward stepwise fashion in a parallel distributed way enabled by the computing capacity of the predictive modeling server system, (e.g., the data center).

Considering the many different types of predictive models that are available, and then that each type of predictive model may have multiple training functions and that multiple hyper-parameter configurations and selected features may be used for each of the multiple training functions, there are many different trained predictive models that can be generated. Depending on the nature of the input data to be used by the trained predictive model to predict an output, different trained predictive models perform differently. That is, some can be more effective than others.

The effectiveness of each of the trained predictive models is estimated (406). For example, a model selection module 210 is operable to estimate the effectiveness of each trained predictive model. In some implementations, cross-validation is used to estimate the effectiveness of each trained predictive model. In a particular example, a 10-fold cross-validation technique is used. Cross-validation is a technique where the training data is partitioned into sub-samples. A number of the sub-samples are used to train an untrained predictive model, and a number of the sub-samples (usually one) is used to test the trained predictive model. Multiple rounds of cross-validation can be performed using different sub-samples for the training sample and for the test sample. K-fold cross-validation refers to portioning the training data into K sub-samples. One of the sub-samples is retained as the test sample, and the remaining K−1 sub-samples are used as the training sample. K rounds of cross-validation are performed, using a different one of the sub-samples as the test sample for each round. The results from the K rounds can then be averaged, or otherwise combined, to produce a cross-validation score. 10-fold cross-validation is commonly used.

In some implementations, the accuracy of each trained predictive model is estimated by performing cross-validation to generate a cross-validation score. In some implementations, the cross-validation score is the number of correct predictions over the total number of predictions. In other implementations, one or more different metrics can be used to estimate the accuracy of a trained model. For example, cross-validation results can be used to indicate whether the trained predictive model generated more false positive results than true positives and ignores any false negatives.

In further implementations, techniques other than, or in addition to, cross-validation can be used to estimate the effectiveness. In one example, the resource usage costs for using the trained model can be estimated and can be used as a factor to estimate the effectiveness of the trained model. A true validation process may also be used that includes separating data in a test/train set (e.g., for one fold).

In some implementations, the predictive modeling server system 206 operates independently from the client computing system 202 and selects and provides the trained predictive model 218 as a specialized service. The expenditure of both computing resources and human resources and expertise to select the untrained predictive models to include in the training function repository 216, the training functions to use for the various types of available predictive models, the hyperparameter configurations to apply to the training functions and the feature-inductors all occurs server-side. Once these selections have been completed, the training and model selection can occur in an automated fashion with little or no human intervention, unless changes to the server system 206 are desired. The client computing system 202 thereby benefits from access to a trained predictive model 218 that otherwise might not have been available to the client computing system 202, due to limitations on client-side resources.

Referring again to FIG. 4, each trained model can be assigned a score that represents the effectiveness of the trained model. As discussed above, the criteria used to estimate effectiveness can vary. In the example implementation described, the criterion is the accuracy of the trained model and is estimated using a cross-validation score. Based on the scores, a trained predictive model is selected (408). In some implementations, the trained models are ranked based on the value of their respective scores, and the top ranking trained model is chosen as the selected predictive model. Although the selected predictive model was trained during the evaluation stage described above, training at that stage may have involved only a sample of the training data, or not all of the training data at one time. For example, if k-fold cross-validation was used to estimate the effectiveness of the trained model, then the model was not trained with all of the training data at one time, but rather only K−1 partitions of the training data. Accordingly, if necessary, the selected predictive model is fully trained using the training data (e.g., all K partitions) (Step 410), for example, by the model training module 212. A trained model (i.e., "fully trained" model) is thereby generated for use in generating predictive output, e.g., trained predictive model 218. The trained predictive model 218 can be stored by the predictive modeling server system 206. That is, the trained predictive model 218 can reside and execute in a data center that is remote from the client computing system 202.

Of the multiple trained predictive models that were trained as described above, some or all of them can be stored in the predictive model repository 215. Each trained predictive model can be associated with its respective effectiveness score. One or more of the trained predictive models in the repository 215 are updateable predictive models. In some implementations, the predictive models stored in the repository 215 are trained using the entire initial training data, i.e., all K partitions and not just K−1 partitions. In other implementations, the trained predictive models that were generated in the evaluation phase using K−1 partitions are stored in the repository 215, so as to avoid expending additional resources to recompute the trained predictive models using all K partitions.

Access to the trained predictive model is provided (412) rather than the trained predictive model itself. In some implementations, providing access to the trained predictive model includes providing an address to the client computing system 202 or other user computing platform that can be used to access the trained model; for example, the address can be a URL (Universal Resource Locator). Access to the trained predictive model can be limited to authorized users. For example, a user may be required to enter a user name and password that has been associated with an authorized user before the user can access the trained predictive model from a computing system, including the client computing system 202.

If the client computing system 202 desires to access the trained predictive model 218 to receive a predictive output, the client computing system 202 can transmit to the URL a request that includes the input data. The predictive modeling server system 206 receives the input data and prediction request from the client computing system 202 (414). In response, the input data is input to the trained predictive model 218 and a predictive output generated by the trained model (416). The predictive output is provided (e.g., to the client computing system (418).

In some implementations, where the client computing system is provided with a URL to access the trained predictive model, input data and a request to the URL can be embedded in an HTML document, e.g., a webpage. In one example, JavaScript can be used to include the request to the URL in the HTML document. Referring again to the illustrative example above, when a customer is browsing on the client computing system's web-based online shopping service, a call to the URL can be embedded in a webpage that is provided to the customer. The input data can be the particular customer's online shopping transaction history. Code included in the webpage can retrieve the input data for the customer, which input data can be packaged into a request that is sent in a request to the URL for a predictive output.

In response to the request, the input data is input to the trained predictive model and a predictive output is generated. The predictive output is provided directly to the customer's computer or can be returned to the client computer system, which can then forward the output to the customer's computer. The client computing system 202 can use and/or present the predictive output result as desired by the client entity.

In this particular example, the predictive output is a prediction of the type of product the customer is most likely to be interested in purchasing. If the predictive output is "blender," then, by way of example, an HTML document executing on the customer's computer may include code that in response to receiving the predictive output cause to display on the customer's computer one or more images and/or descriptions of blenders available for sale on the client computing system's online shopping service. This integration is simple for the client computing system, because the interaction with the predictive modeling server system can use a standard HTTP protocol, e.g. GET or POST can be used to make a request to a URL that returns a JSON (JavaScript Object Notation) encoded output. The input data also can be provided in JSON format.

The customer using the customer computer can be unaware of these operations, which occur in the background without necessarily requiring any interaction from the customer. Advantageously, the request to the trained predictive model can seamlessly be incorporated into the client computer system's web-based application, in this example an online shopping service. A predictive output can be generated for and received at the client computing system (which in this example includes the customer's computer), without expending client computing system resources to generate the output.

In other implementations, the client computing system can use code (provided by the client computing system or otherwise) that is configured to make a request to the predictive modeling server system 206 to generate a predictive output using the trained predictive model 218. By way of example, the code can be a command line program (e.g., using cURL) or a program written in a compiled language (e.g., C, C++, Java) or an interpreted language (e.g., Python). In some implementations, the trained model can be made accessible to the client computing system or other computer platforms by an API through a hosted development and execution platform, e.g., Google App Engine.

In the implementations described above, the trained predictive model 218 is hosted by the predictive modeling server system 206 and can reside and execute on a computer at a location remote from the client computing system 202. However, in some implementations, once a predictive model has been selected and trained, the client entity may desire to download the trained predictive model to the client computing system 202 or elsewhere. The client entity may wish to generate and deliver predictive outputs on the client's own computing system or elsewhere. Accordingly, in some implementations, the trained predictive model 218 is provided to a client computing system 202 or elsewhere, and can be used locally by the client entity.

Components of the client computing system 202 and/or the predictive modeling server system 206 (e.g., the model training module 212, model selection module 210 and trained predictive model 218), can be realized by instructions that upon execution cause one or more computers to carry out the operations described above. Such instructions can comprise, for example, interpreted instructions, such as script instructions, e.g., JavaScript or ECMAScript instructions, or executable code, or other instructions stored in a computer readable medium. The components of the client computing system 202 and/or the predictive modeling server system 206 can be implemented in multiple computers distributed over a network, such as a server farm, in one or more locations, or can be implemented in a single computer device.

As discussed above, the predictive modeling server system 206 can be implemented in the cloud. In some implementations, the predictive modeling server system 206 provides a web-based service. A web page at a Uniform Resource Locator (URL) provided by the predictive modeling server system 206 can be accessed by the client computing system 202. An operator of the client computing system 202 can follow instructions displayed on the web page to upload training data "to the cloud", i.e., to the predictive modeling server system 206. Once completed, the operator can enter an input to initiate the training and selecting operations to be performed "in the cloud", i.e., by the predictive modeling server system 206, or these operations can be automatically initiated in response to the training data having been uploaded.

The operator of the client computing system 202 can access the one or more trained models that are available to the client computing system 202 from the web page. For example, if more than one set of training data (e.g., relating to different types of input that correspond to different types of predictive output) had been uploaded by the client computing system 202, then more than one trained predictive model may be available to the particular client computing system. Representations of the available predictive models can be displayed, for example, by names listed in a drop down menu or by icons displayed on the web page, although other representations can be used. The operator can select one of the available predictive models, e.g., by clicking on the name or icon. In response, a second web page (e.g., a form) can be displayed that prompts the operator to upload input data that can be used by the selected trained model to provide predictive output data (in some implementations, the form can be part of the first web page described above). For example, an input field can be provided, and the operator can enter the input data into the field. The operator may also be able to select and upload a file (or files) from the client computing system 202 to the predictive modeling server system 206 using the form, where the file or files contain the input data. In response, the selected predicted model can generate predictive output based on the input data provided, and provide the predictive output to the client computing system 202 either on the same web page or a different web page. The predictive output can be provided by displaying the output, providing an output file or otherwise.

In some implementations, the client computing system 202 can grant permission to one or more other client computing systems to access one or more of the available trained predictive models of the client computing system. The web page used by the operator of the client computing system 202 to access the one or more available trained predictive models can be used (either directly or indirectly as a link to another web page) by the operator to enter information identifying the one or more other client computing systems being granted access and possibly specifying limits on their accessibility. Conversely, if the client computing system 202 has been granted access by a third party (e.g., an entity controlling a different client computing system) to access one or more of the third party's trained models, the operator of the client computing system 202 can access the third party's trained models using the web page in the same manner as accessing the client computing system's own trained models (e.g., by selecting from a drop down menu or clicking an icon).

Figure 5:
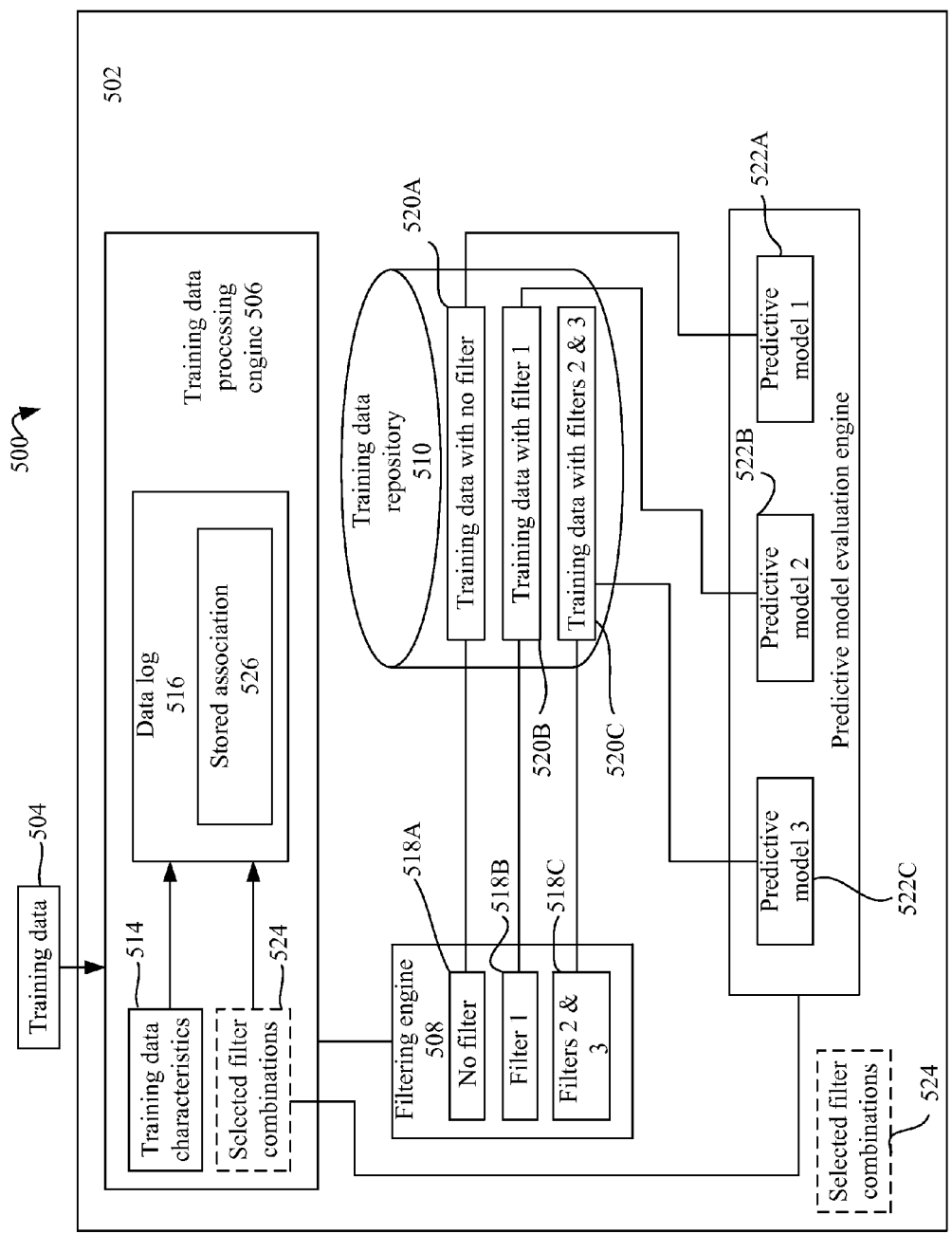
FIG. 5 is a schematic block diagram showing an example system for providing a predictive analytic platform.

FIG. 5 shows a system 500 that includes a predictive modeling server system 502 which may include one or more functions of the predictive modeling server systems 109, 206 (FIGS. 1 and 2, respectively). The predictive modeling server system 502 is configured to receive training data 504 from one or more sources of training data (e.g., client computing systems) in any of the ways described above, for example.

A training data processing engine 506 associated with the predictive modeling server system 502 receives the training data 504, and identifies one or more characteristics 514 of the training data 504. For example, the training data processing engine 506 may identify characteristics 514 associated with the training data 504, such as a number of features (e.g., a number of columns in a table representing the training data) or types of features (e.g., a subject line of an email, a body of an email, an author of a forum post, etc.). The training data characteristics 514 can also relate to an identity of a user or entity that uploaded the training data (or with whom the training data 504 is otherwise associated). The characteristics 514 of the training data 504 can be stored in a data log 516 along with other data, as will be described below.

The training data processing engine 506 passes the training data 504 to a filtering engine 508 which may be capable of applying zero, one, or more filters to the training data 504 in various combinations. By applying various combinations of filters to the training data 504, the filtering engine 508 can generate new, altered instances of the training data 504 on which predictive models can be trained. The altered training data can then be stored in a training data repository 510. In some examples, the training data 504 can be pre-screened in order to determine which filters, if any, should be applied to the training data 504. In some examples, the filtering engine 508 may analyze the training data 504 to determine whether a given feature appears in a threshold number or percentage of the examples within the training data set 504. For example, if the training data 504 includes text-based examples where a given bigrams appears infrequently (e.g., one time in one thousand examples), the filtering engine may determine that the examples are relatively diverse, and may determine that applying one or more filters (e.g., a bigram filter) will not provide a large enough benefit to justify the associated resource cost. Similarly, if the filtering engine 508 determines that a given bigram occurs frequently in the examples of the training data set 504, the filtering engine 508 could determine that applying one or more filters (e.g., a bigram filter) would be useful.

In this case, the filtering engine 508 applies no filter 518A to the training data 504 (e.g., the training data 504 is not altered), and the resulting first instance of training data 520A is stored in the training data repository 510. The filtering engine 508 applies filter 1 518B to the training data 504 to generate a second instance of training data 520B. The second instance of training data 520B is stored in the training data repository 510. The filtering engine 508 also applies a combination of filters 2 and 3 518C to the training data 504, and the resulting third instance of training data 520C is stored in the training data repository 510.

A simplified example of how the filtering engine 508 can apply combinations of filters to modify the training data 504 will now be described. TABLE 3 below shows how the last example in TABLE 2 could be altered using a bigram filter. In general, a bigram is a group of two written letters, two syllables, or, as in the current example, two words.

TABLE 3

| EMAIL SUBJECT LINE | A | B | C | ANSWER |
|---|---|---|---|---|
| "Trip to New York" | Trip | to | New York | "not spam" |

With the application of a bigram filter, the known bigram "New York" has been identified in the text of the example. As a result, the columns "New" and "York" from TABLE 2 have been replaced with the column "New York" (column C) in TABLE 3. In some examples, the application of filters (e.g., a bigram filter) can allow the training data 504 to be broken down into more useful or telling pieces of information. For example, in some situations, the bigram "New York" may be more useful as a basis for a predictive model than the individual words "New" and "York," as the bigram "New York" has a more specific meaning than its individual words. Bigrams are an example of an "n-gram" filter, where n has a value from 1 to some integer value (in the case of a bigram, the value of n is equal to 2). In some examples, the value of n may range from 1 to 5.

In addition to the bigram filter described above, the filtering engine 508 may apply other types of filters to the training data 504. For text-based training data, the filtering engine 508 may apply a stopword filter that ignores (or otherwise reduces the importance or weighting of features during the training of a predictive model) function words (e.g., the words: a, an, the, of). The filtering engine 508 may also apply a punctuation filter to text-based training data. In some examples, a punctuation filter is configured to detect punctuation marks, such as periods and commas. For example, by applying a punctuation filter to the sentence "This is a cat.", the word of "cat" (instead of "cat.") can be recognized. This may be useful, for example, because the word "cat" in the middle of a sentence may have basically the same meaning as the word "cat" at the end of a sentence that ends with a period, question mark, or other punctuation. In some examples, it may be desirable for the filtering engine to consider all occurrences of the word "cat" equally to preserve generality.

The filtering engine 508 may also a stemming filter. In some examples, a stemming filter removes (or otherwise reduces the importance or weighting of) inflection within a word or sentence. For example, if a stemming filter is applied to the sentence "He likes to read.", the word "likes" can be stemmed to "like." Again, like in the use of the stopword filter described above, it may be desirable to maintain generality in such cases. For example, by stemming the word "running" to "run", the text-based examples "I went running" and "I like to run" may be considered closer in similarity than to the text-based example "I enjoy biking" (e.g., because the verbs "running" and "run" will be considered equally). Accordingly, in this example, stemming prevents the filtering engine 508 from determining that "run" and "running" are as different as "run" and "biking."

In some examples, the training data may include numeric data, and the filtering engine 508 may apply different types of filters to the numeric data. For example, the filtering engine 508 may apply a "shift and scale" filter to the training data 504. The shift and scale filter may normalize the numbers in the training data 504 to have a mean of zero and/or a unit variance of zero. This technique may help to normalize data sets that include anomalies. In some examples, one or more machine learning algorithms may perform better when using input data having a zero mean.

The filtering engine 508 may also apply a p-degree polynomial filter, where the value of p represents a power greater than, or equal to, 2. For example, the filtering engine 508 may apply a p-degree polynomial filter when the input data is non-linear. For example, given an input variable x, a new feature $x2$ can be added that might have more expressive power under certain models (e.g., for predicting a result that changes based on a square, for some number of messages within a group of N people, in a linear model). The filtering engine 508 may also apply filters to the training data 504 that perform other non-linear transformation of the numeric data (e.g., logarithmic functions and square root functions). In some examples, the filtering engine 508 may also apply filters to the training data 508 that cause spine-like transformations of numeric data (e.g., $I(a<x<b)$, where I is an indicator function).

These filters may be useful when the training data changes at a cut off point. For example, the training data may be associated with a linear function under a value k, but may increase quadratically above values of k. In such a case, using an indicator function may allow the two data segments (i.e., the data below k and the data above k) to be predicted separately.

With the first, second, and third instances of training data 520A-C stored in the training data repository 510 (e.g., as a result of the application of none, one, and two filters, respectively), the predictive model evaluation engine 512 may generate predictive models. For example, the predictive model evaluation engine 512 generates a predictive model 1 522A based on the first instance of training data 520A. Similarly, the predictive model evaluation engine 512 generates a predictive model 2 522B based on the second instance of training data 520B, and generates a predictive model 3 522C based on the third instance of training data 520C. The predictive models 522A-C may be generated in any sequence, and may be stored separately or together once generated. While only one predictive model evaluation engine 512 is shown, the predictive modeling server system 502 could include any number of predictive model evaluation engines that could work, for example, in parallel to generate predictive models based on instances of training data. In some examples, an instance of training data (e.g., the second instance of training data 520B) can be used to generate a plurality of predictive models models.

The predictive model evaluation engine 512 evaluates the predictive models 522A-C (using, for example, one or more of the evaluation techniques described above, such as K-fold cross-validation). In some examples, because the predictive models 522A-C are based on the same training data 504 and only differ with regard to the filters applied by the filtering engine 508, determining the effectiveness of the predictive models 522A-C may also determine, by extension, the relative effectiveness of each filter combination. For example, if the predictive model evaluation engine 512 determines that predictive model 2 522B is the most effective predictive model of the predictive models 522A-C based on its determined accuracy, the predictive model evaluation engine 512 may identify filter 1 518B as the most effective filter of those tested.

The predictive model evaluation engine 512 can identify any number of filters and/or filter combinations as effective filters. For example, the predictive model evaluation engine 512 may compare the accuracy of a predictive model against a predetermined accuracy threshold (e.g., 70% accurate). As a result, the predictive model evaluation engine 512 may identify a filter combination used to generate a predictive model that satisfies the accuracy threshold as an effective filter and/or filter combination. In some examples, the predictive model evaluation engine 512 can be configured to rank the predictive models and/or their associated filters and may select a predetermined number of filters as effective filters. For example, the predictive model evaluation engine 512 may identify the top three filters and/or filter combinations based on the determined accuracy of their associated predictive models.

The predictive model evaluation engine 512 provides the selected filter combinations 524 to the training data processing engine 506. For example, the predictive model evaluation engine 512 may identify filter 1 518B as the most effective filter combination of those tested, and may provide an indication of that result to the training data processing engine 506. The training data processing engine may use the training data characteristics 514 and the selected filter combinations 524 to store an association between the training data characteristics 514 and the selected filters 524 in a data log 516 (e.g., as stored association 526).

By maintaining a record of the stored association, the predictive modeling server system 502 may be able to identify useful filter combinations to apply to future sets of training data that share a threshold level of training data characteristics with those in the stored association 526. For example, if the training data processing engine 506 receives a future set of training data from the same entity that provided the training data 504, and the future set of training data also contains a similar number of features, the training data processing engine 506 could identify an optimal set of filters (e.g., by accessing the stored association 526) for use with the future set of training data. For example, a future set of training data may be received that has specific characteristics (e.g., the future set of training data may have a text decomposition that is similar to a previous dataset, such as the training data 504). In this case, the training data processing engine 506 could then cause the filtering engine 508 to apply a previously tested combination of filters to the future set of training data, which could allow the predictive modeling server system 502 to quickly generate accurate predictive models without having to needlessly test less effective filters with the future set of training data.

Figure 6:
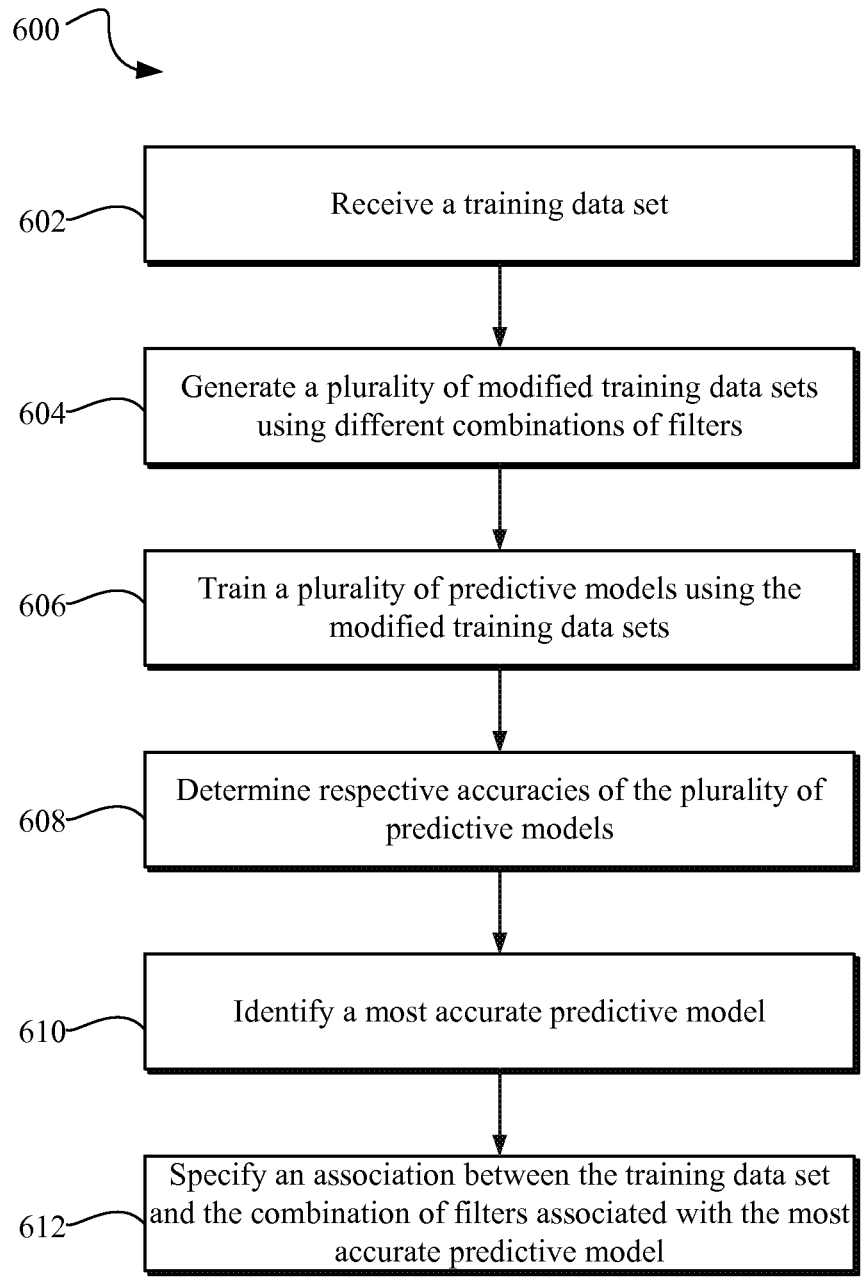
FIG. 6 is a flowchart that shows an example process for using filters in a predictive analytic platform.

FIG. 6 shows a process 600 for specifying an association between the training data set and the combination of filters associated with the most accurate predictive model. A training data set is received (602). For example, training data can be uploaded from a client computing system to a predictive modeling server system over a network. The training data can include initial training data, which may be a relatively large volume of training data the client entity has accumulated, for example, if the client entity is a first-time user of the system 100. The training data can also include new training data that can be uploaded from the client computing system as additional training data becomes available. The client computing system may upload new training data whenever the new training data becomes available on an ad hoc basis, periodically in batches, in a batch once a certain volume has accumulated, or otherwise.

A plurality of modified training data sets are generated using different combinations of filters (604). For example, a predictive modeling server system such as that shown in FIG. 5 may apply zero, one, or more filters to the set of training data in order to provide instances of modified training data, where each instance of modified training data is based on a different combination of filters.

A plurality of predictive models is trained using the modified training data sets (606). In some examples, a predictive modeling server trains a predictive model based on each of the modified training data sets, and the generated predictive models may include a predictive model based on a training data set to which a filter has not been applied.

Respective accuracies of predictive models are determined (608). For example, a predictive modeling server may determine the accuracy of a predictive model (sometimes referred to as the level of effectiveness) using one or more of the techniques described above. For example, in some implementations, cross-validation (such as a 10-fold cross-validation technique) can be used to estimate the effectiveness of each trained predictive model. As described above, the respective accuracies can be represented by scores. In some examples, the predictive modeling server may calculate accuracy scores until a predetermined threshold is satisfied by one or more of the predictive models. Respective accuracies can be determined for each of a plurality of predictive models.

A most accurate predictive model is identified (610). In some examples, after the predictive modeling server system has evaluated the predictive models, the predictive modeling server system can select one or more of the predictive models as the most accurate (or most effective) predictive model(s). The predictive modeling server system can identify and/or designate any number of predictive models as the most accurate predictive models. For example, the predictive modeling server system may select the top three predictive models as being the most accurate.

In some examples, because the predictive models are based on the same root set of training data and only differ with regard to the filters applied to the set of training data, determining the effectiveness of the predictive models may also determine, by extension, the relative effectiveness of each filter combination. For example, if the predictive modeling server system determines that a predictive model is the most effective predictive model of the predictive models, the predictive modeling server system may identify the filter combination associated with that predictive model as the most effective or most accurate filter combination of those tested.

The predictive model evaluation engine 512 can identify any number of filters and/or filter combinations as effective filters. For example, the predictive modeling server system may compare the accuracy of a predictive model against a predetermined accuracy threshold. As a result, the predictive modeling server system may identify any filter combination used to generate a predictive model that satisfies the accuracy threshold as an effective filter and/or filter combination. In some examples, the predictive modeling server system can be configured to rank the predictive models and/or their associated filters, and may select a predetermined number of filters as effective filters. For example, the predictive modeling server system may identify the top three filters and/or filter combinations based on the level of accuracy of their associated predictive models.

As association is specified between the training data set and the combination of filters associated with the most accurate predictive model (612). For example, the predictive modeling server system may store an association between the set of training data and the most accurate filter combinations in a data log.

In some examples, specifying an association between the training data set and the combination of filters associated with the most accurate predictive model may include storing an association between characteristics of the set of training data and the most accurate filter combinations. By maintaining a record of the stored association(s), the predictive modeling server system may be able to identify useful filter combinations to apply to future sets of training data that share a threshold level of training data characteristics with those in the stored association.

Figure 7:
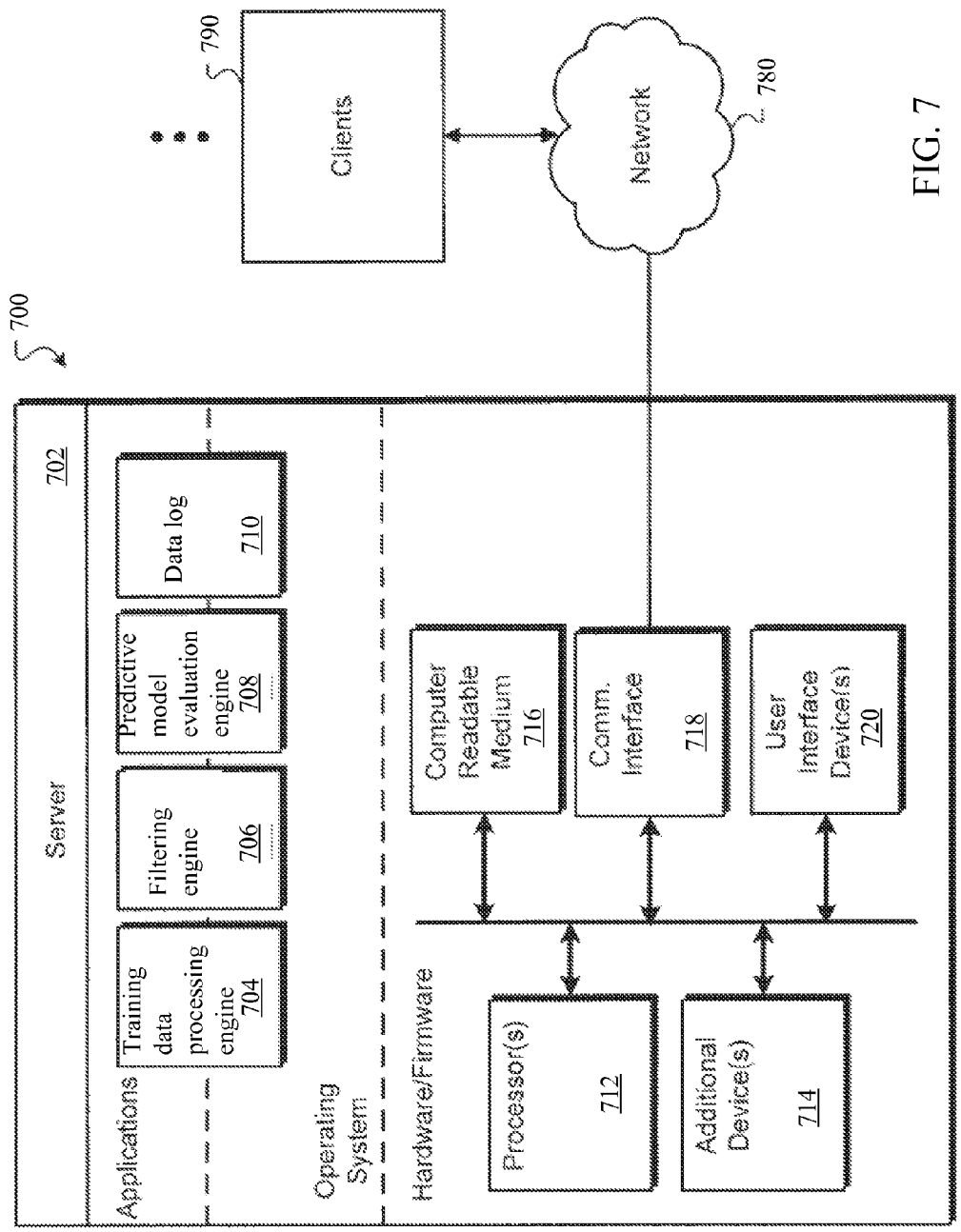
FIG. 7 shows an example server.

FIG. 7 is a schematic diagram of an example server. The server 702 is optionally connected to one or more user or client computers 790 through a network 780. The server 702 consists of one or more data processing apparatuses. While only one data processing apparatus is shown in FIG. 7, multiple data processing apparatus can be used. The server 702 includes various software modules, e.g. executable software programs or libraries, including a training data processing engine 704, a filtering engine 706, a prediction model evaluation engine 708, and a data log 710. Although several software modules are illustrated, there may be fewer or more software modules. Moreover, the software modules can be distributed on one or more data processing apparatus connected by one or more networks or other suitable communication mediums.

The server 702 also includes hardware or firmware devices including one or more processors 712, one or more additional devices 714, a computer readable medium 716, a communication interface 718, and one or more user interface devices 720. Each processor 712 is capable of processing instructions for execution within the server 702. In some implementations, the processor 712 is a single or multi-threaded processor. Each processor 712 is capable of processing instructions stored on the computer readable medium 716 or on a storage device such as one of the additional devices 714. The server 702 uses its communication interface 718 to communicate with one or more computers 790, for example, over a network 780. Examples of user interface devices 720 include a display, a camera, a speaker, a microphone, a tactile feedback device, a keyboard, and a mouse. The server 702 can store instructions that implement operations associated with the modules described above, for example, on the computer readable medium 716 or one or more additional devices 714, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer-implemented method, the method comprising:
  receiving a training data set that comprises a plurality of examples, wherein each example comprises one or more features and an answer;
  generating a plurality of modified training data sets, wherein generating each of the modified training data sets comprises applying a respective filter or combination of filters to examples in the training data set to generate the examples of the modified training data set, the filter or combination of filters altering one or more of the examples;

training a plurality of predictive models, including training each of one or more predictive models using a different respective modified training data set of the plurality of modified training data sets;

determining a respective accuracy for each of the plurality of predictive models;

identifying a most accurate predictive model based on the determined respective accuracies; and specifying an association between the training data set and the filter or combination of filters used to generate the modified training data set that was used to train the most accurate predictive model.

2. The computer-implemented method of claim 1, further comprising:

identifying one or more characteristics of the training data set.

3. The computer-implemented method of claim 2, wherein specifying an association between the training data set and the filter or combination of filters associated with the most accurate predictive model comprises specifying an association between the filter or combination of filters and the one or more characteristics of the training data set.

4. The computer-implemented method of claim 3, further comprising:

receiving a second training data set; and determining that the second training data set has one or more characteristics that are similar to the one or more characteristics of the training data set.

5. The computer-implemented method of claim 4, wherein determining that the second training data set has one or more characteristics that are similar to the one or more characteristics of the training data set comprises:

determining that a level of similarity between the one or more characteristics of the second training data set and the one or more characteristics of the training data set satisfies a predetermined threshold.

6. The computer-implemented method of claim 4, further comprising applying the filter or combination of filters associated with the most accurate predictive model to the second training data set based on determining that the second training data set has one or more characteristics that are similar to the one or more characteristics of the training data set.

7. The computer-implemented method of claim 1, further comprising training an unfiltered predictive model based on the training data set, the unfiltered predictive model being trained without an application of a filter or combination of filters; and determining a level of accuracy associated with the unfiltered predictive model.

8. The computer-implemented method of claim 1, wherein:

the training data set comprises text-based data; and the filter or combination of filters comprises one or more of an n-gram filter, a stop word filter, a punctuation filter, and a stemming filter.

9. The computer-implemented method of claim 1, wherein:

the training data set comprises numerical data; and the filter or combination of filters comprises one or more of a shift and scale filter, a p-degree polynomial filter, and a spline transformation filter.

10. The computer-implemented method of claim 7, further comprising:

determining that the most accurate predictive model is the unfiltered predictive model;

identifying one or more characteristics of the training data set;

receiving a second training data set;

determining that the second training set has one or more characteristics that are similar to one or more characteristics of the training data set; and training each of one or more predictive models using the second training data set without an application of a filter or combination of filters to the second training data set.

11. The computer-implemented method of claim 10, wherein determining that the second training set has one or more characteristics that are similar to the one or more characteristics of the training data set comprises:

determining that a level of similarity between the one or more characteristics of the second training data set and the one or more characteristics of the training data set satisfies a predetermined threshold.

12. One or more non-transitory computer storage devices comprising instructions that, when executed by one or more processing devices, cause the one or more processing devices to perform operations comprising:

receiving a training data set that comprises a plurality of examples, wherein each example comprises one or more features and an answer;

generating a plurality of modified training data sets, wherein generating each of the modified training data sets comprises applying a respective filter or combination of filters to examples in the training data set to generate the examples of the modified training data set, the filter or combination of filters altering one or more of the examples;

training a plurality of predictive models, including training each of one or more predictive models using a different respective modified training data set of the plurality of modified training data sets;

determining a respective accuracy for each of the plurality of predictive models;

identifying a most accurate predictive model based on the determined respective accuracies; and specifying an association between the training data set and the filter or combination of filters used to generate the modified training data set that was used to train the most accurate predictive model.

13. The one or more computer storage devices of claim 12, further comprising instructions that, when executed by one or more processing devices, cause the one or more processing devices to perform operations comprising:

identifying one or more characteristics of the training data set.

14. The one or more computer storage devices of claim 13, wherein specifying an association between the training data set and the filter or combination of filters associated with the most accurate predictive model comprises specifying an association between the filter or combination of filters and the one or more characteristics of the training data set.

15. The one or more computer storage devices of claim 14, further comprising instructions that, when executed by one or more processing devices, cause the one or more processing devices to perform operations comprising:

receiving a second training data set; and determining that the second training data set has one or more characteristics that are similar to the one or more characteristics of the training data set.

16. The one or more computer storage devices of claim 15, wherein determining that the second training data set has one or more characteristics that are similar to the one or more characteristics of the training data set comprises:

determining that a level of similarity between the one or more characteristics of the second training data set and the one or more characteristics of the training data set satisfies a predetermined threshold.

17. The one or more computer storage devices of claim 15, further comprising instructions that, when executed by one or more processing devices, cause the one or more processing devices to perform operations comprising:
applying the filter or combination of filters associated with the most accurate predictive model to the second training data set based on determining that the second training data set has one or more characteristics that are similar to the one or more characteristics of the training data set.

18. The one or more computer storage devices of claim 12, further comprising instructions that, when executed by one or more processing devices, cause the one or more processing devices to perform operations comprising:
training an unfiltered predictive model based on the training data set, the unfiltered predictive model being trained without an application of the one or more filters; and
determining a level of accuracy associated with the unfiltered predictive model.

19. The one or more computer storage devices of claim 12, wherein:
the training data set comprises text-based data; and
the filter or combination of filters comprises one or more of a n-gram filter, a stop word filter, a punctuation filter, or a stemming filter.

20. The one or more computer storage devices of claim 12, wherein:
the training data set comprises numerical data; and
the filter or combination of filters comprises one or more of a shift and scale filter, a p-degree polynomial filter, or a spline transformation filter.

21. The one or more computer storage devices of claim 18, further comprising:
determining that the most accurate predictive model is the unfiltered predictive model;
identifying one or more characteristics of the training data set;
receiving a second training data set;
determining that the second training set has one or more characteristics that are similar to one or more characteristics of the training data set; and
training each of one or more predictive models using the second training data set without an application of a filter or combination of filters to the second training data set.

22. The one or more computer storage devices of claim 21, wherein determining that the second training set has one or more characteristics that are similar to the one or more characteristics of the training data set comprises:
determining that a level of similarity between the one or more characteristics of the second training data set and the one or more characteristics of the training data set satisfies a predetermined threshold.

23. A system comprising:
one or more processing devices; and
one or more memory devices comprising instructions that, when executed by the one or more processing devices, cause the one or more processing devices to perform operations comprising:
receiving a training data set that comprises a plurality of examples, wherein each example comprises one or more features and an answer;
generating a plurality of modified training data sets, wherein generating each of the modified training data sets comprises applying a respective filter or combination of filters to examples in the training data set to generate the examples of the modified training data set, the filter or combination of filters altering one or more of the examples;
training a plurality of predictive models, including training each of one or more predictive models using a different respective modified training data set of the plurality of modified training data sets;
determining a respective accuracy for each of the plurality of predictive models;
identifying a most accurate predictive model based on the determined respective accuracies; and
specifying an association between the training data set and the filter or combination of filters used to generate the modified training data set that was used to train the most accurate predictive model.

24. The system of claim 23, wherein the one or more memory devices further comprise instructions that, when executed by one or more processing devices, cause the one or more processing devices to perform operations comprising:
identifying one or more characteristics of the training data set.

25. The system of claim 24, wherein specifying an association between the training data set and the filter or combination of filters associated with the most accurate predictive model comprises specifying an association between the filter or combination of filters and the one or more characteristics of the training data set.

26. The system of claim 25, wherein the one or more memory devices further comprise instructions that, when executed by one or more processing devices, cause the one or more processing devices to perform operations comprising:
receiving a second training data set; and
determining that the second training data set has one or more characteristics that are similar to the one or more characteristics of the training data set.

27. The system of claim 26, wherein determining that the second training data set has one or more characteristics that are similar to the one or more characteristics of the training data set comprises:
determining that a level of similarity between the one or more characteristics of the second training data set and the one or more characteristics of the training data set satisfies a predetermined threshold.

28. The system of claim 26, wherein the one or more memory devices further comprise instructions that, when executed by one or more processing devices, cause the one or more processing devices to perform operations comprising:
applying the filter or combination of filters associated with the most accurate predictive model to the second training data set based on determining that the second training data set has one or more characteristics that are similar to the one or more characteristics of the training data set.

29. The system of claim 23, wherein the one or more memory devices further comprise instructions that, when executed by one or more processing devices, cause the one or more processing devices to perform operations comprising:
training an unfiltered predictive model based on the training data set, the unfiltered predictive model being trained without an application of the one or more filters; and
determining a level of accuracy associated with the unfiltered predictive model.

30. The system of claim 23, wherein:
the training data set comprises text-based data; and
the filter or combination of filters comprises one or more of a n-gram filter, a stop word filter, a punctuation filter, and a stemming filter.

31. The system of claim 23, wherein:
the training data set comprises numerical data; and
the filter or combination of filters comprises one or more of a shift and scale filter, a p-degree polynomial filter, and a spline transformation filter.

32. The system of claim 29, wherein the one or more memory devices further comprises instructions that, when executed by one or more processing devices, cause the one or more processing devices to perform operations comprising:
determining that the most accurate predictive model is the unfiltered predictive model;
identifying one or more characteristics of the training data set;
receiving a second training data set;
determining that the second training set has one or more characteristics that are similar to one or more characteristics of the training data set; and
training each of one or more predictive models using the second training data set without an application of a filter or combination of filters to the second training data set.

33. The system of claim 32, wherein determining that the second training set has one or more characteristics that are similar to the one or more characteristics of the training data set comprises:
determining that a level of similarity between the one or more characteristics of the second training data set and the one or more characteristics of the training data set satisfies a predetermined threshold.

34. A computer-implemented method, the method comprising:
receiving a training data set that comprises a plurality of examples, wherein each example comprises one or more features and an answer;
identifying one or more characteristics of the training data set;
generating a plurality of modified training data sets by applying one or more filters to the training data set, each of the plurality of modified training data sets being based on a different combination of the one or more filters;
training a plurality of predictive models, each of the plurality of predictive models being trained using a different modified training data set of the plurality of modified training data sets;
determining a respective accuracy for each of the plurality of predictive models;
identifying a most accurate predictive model based on the determined respective accuracies; and
specifying an association between the training data set and the one or more filters used to generate the modified training data set that was used to train the most accurate predictive model, including specifying an association between the one or more filters and the one or more characteristics of the training data set.

35. The computer-implemented method of claim 34, further comprising:
receiving a second training data set; and
determining that the second training data set has one or more characteristics that are similar to the one or more characteristics of the training data set.

36. The computer-implemented method of claim 35, wherein determining that the second training data set has one or more characteristics that are similar comprises:
determining a level of similarity between the characteristics of the second training data set and the one or more characteristics of the training data set; and
determining that the level of similarity satisfies a threshold.

37. The computer-implemented method of claim 35, further comprising applying the one or more filters associated with the most accurate predictive model to the second training data set based on determining that the second training data set has one or more characteristics that are similar to the one or more characteristics of the training data set.

38. A computer-implemented method, the method comprising:
receiving a training data set that comprises a plurality of examples, wherein each example comprises one or more features and an answer;
generating a plurality of modified training data sets by applying one or more filters to the training data set, each of the plurality of modified training data sets being based on a different combination of the one or more filters;
training a plurality of predictive models, each of the plurality of predictive models being trained using a different modified training data set of the plurality of modified training data sets;
determining a respective accuracy for each of the plurality of predictive models;
training an unfiltered predictive model based on the training data set, the unfiltered predictive model being trained without an application of the one or more filters; and
determining a level of accuracy associated with the unfiltered predictive model
identifying a most accurate predictive model based on the determined respective accuracies; and
specifying an association between the training data set and the one or more filters used to generate the modified training data set that was used to train the most accurate predictive model.

* * * * *